(12) United States Patent
Zhao et al.

(10) Patent No.: US 9,982,169 B2
(45) Date of Patent: May 29, 2018

(54) METHOD AND APPARATUS FOR ADHESIVE BONDING IN AN AQUEOUS MEDIUM

(71) Applicants: Boxin Zhao, Waterloo (CA); Fut (Kuo) Yang, Markham (CA)

(72) Inventors: Boxin Zhao, Waterloo (CA); Fut (Kuo) Yang, Markham (CA)

( * ) Notice: Subject to any disclaimer, the term of this patent is extended or adjusted under 35 U.S.C. 154(b) by 146 days.

(21) Appl. No.: 14/360,986

(22) PCT Filed: Nov. 28, 2012

(86) PCT No.: PCT/CA2012/050855
§ 371 (c)(1),
(2) Date: May 28, 2014

(87) PCT Pub. No.: WO2013/078557
PCT Pub. Date: Jun. 6, 2013

(65) Prior Publication Data
US 2014/0311673 A1   Oct. 23, 2014

Related U.S. Application Data

(60) Provisional application No. 61/629,789, filed on Nov. 28, 2011.

(51) Int. Cl.
| | |
|---|---|
| C09J 9/00 | (2006.01) |
| C09J 105/04 | (2006.01) |
| C09J 11/02 | (2006.01) |
| B29C 65/48 | (2006.01) |
| C08K 3/20 | (2006.01) |
| C08K 3/22 | (2006.01) |
| C08K 3/30 | (2006.01) |
| C08K 5/00 | (2006.01) |
| C08K 5/13 | (2006.01) |
| C08K 5/17 | (2006.01) |
| C08L 5/04 | (2006.01) |
| C08L 25/18 | (2006.01) |

(52) U.S. Cl.
CPC ............. *C09J 9/00* (2013.01); *B29C 65/4855* (2013.01); *C09J 11/02* (2013.01); *C09J 105/04* (2013.01); *C08K 3/20* (2013.01); *C08K 3/30* (2013.01); *C08K 5/0091* (2013.01); *C08K 5/13* (2013.01); *C08K 5/17* (2013.01); *C08K 2003/2265* (2013.01); *C08L 5/04* (2013.01); *C08L 25/18* (2013.01)

(58) Field of Classification Search
CPC .................................. C09J 11/02; C09J 105/04
USPC .......................................... 156/325; 523/177
See application file for complete search history.

(56) References Cited

U.S. PATENT DOCUMENTS

| | | | |
|---|---|---|---|
| 5,015,677 | A | 5/1991 | Benedict et al. |
| 5,665,477 | A | 9/1997 | Meathrel et al. |
| 6,506,577 | B1 | 1/2003 | Deming et al. |
| 7,622,533 | B2 | 11/2009 | Lee |
| 7,622,550 | B2 | 11/2009 | Cha et al. |
| 7,943,703 | B2 | 5/2011 | Shull et al. |
| 8,227,628 | B2 | 7/2012 | Messersmith et al. |
| 8,283,384 | B2 | 10/2012 | Stewart et al. |
| 8,293,867 | B2 | 10/2012 | Messersmith et al. |
| 2003/0087338 | A1 | 5/2003 | Messersmith et al. |
| 2005/0288398 | A1 | 12/2005 | Messersmith et al. |
| 2008/0171012 | A1 | 7/2008 | Messersmith et al. |
| 2008/0247984 | A1 | 10/2008 | Messersmith et al. |
| 2009/0036611 | A1 | 2/2009 | Wilker et al. |
| 2010/0028718 | A1 | 2/2010 | Oboodi et al. |
| 2010/0120923 | A1 | 5/2010 | Stewart et al. |
| 2010/0137902 | A1 | 6/2010 | Lee et al. |
| 2011/0027250 | A1 | 2/2011 | Messersmith et al. |
| 2011/0052788 | A1 | 3/2011 | Messersmith et al. |

FOREIGN PATENT DOCUMENTS

| | | |
|---|---|---|
| CN | 101065134 | 10/2007 |
| CN | 101978040 | 2/2011 |
| WO | 2011084710 | 7/2011 |

OTHER PUBLICATIONS

European Patent Office, Extended European Search Report for European Patent Application No. 12854175.2, dated Sep. 9, 2015.
Canadian Intellectual Propery Office as International Searching Authority, International Search Report and Written Opinion for PCT Patent Appln. No. CA2012/050855, dated Feb. 13, 2013.
State Intellectual Property Office, Office Action for Chinese Patent App. No. 201280067380.X, dated Dec. 1, 2015.
State Intellectual Property Office, Office Action for Chinese Patent Application No. 201280067380.X, dated Aug. 2, 2016.

*Primary Examiner* — Edward J Cain
(74) *Attorney, Agent, or Firm* — Gowling WLG (Canada) LLP; Jeffrey W. Wong

(57) ABSTRACT

The disclosure is directed to an adhesive material which can be applied underwater comprising hydrophilic adhesive molecules. In other embodiments, the adhesive material may also include hydrophilic polymers and/or an oxidizing agent.

20 Claims, 5 Drawing Sheets

METHOD AND APPARATUS FOR ADHESIVE BONDING IN AN AQUEOUS MEDIUM

REFERENCE TO RELATED APPLICATION

This application is a formal application based on and claiming the benefit of U.S. provisional application No. 61/629,789, filed Nov. 28, 2011.

FIELD OF THE DISCLOSURE

The disclosure is generally directed at adhesive materials, and more specifically at a method and apparatus for adhesive bonding in an aqueous medium.

BACKGROUND OF THE DISCLOSURE

Effective underwater adhesives can bring many benefits to industries or activities which deal with underwater operations. Applications such as attaching sensors to surfaces which are located in a body of water, repairing wet tissues, or patching leaky underwater oil pipelines can be improved. However, establishing underwater adhesion up to this point has proven to be problematic. In the field of adhesion science, water or moisture has traditionally been treated as surface contaminants or weak boundary layers. Synthetic adhesives perform poorly on wet surfaces or when used underwater due to a variety of complex mechanisms of deterioration including, but not limited to, erosion, plasticization, swelling, and hydrolysis of the adhesive polymers. Even though some may have strong bulk cohesive strength underwater, these adhesives tend to eventually fail due to the wicking and crazing of water due to poor interfacial adhesions.

Many of the solutions focusing on establishing underwater adhesion have been inspired by discoveries and phenomena found in nature. For instance, in the sea, there is a diversity of organisms that specialize in sticking to all type of wet surfaces: mussels hang on with a handful of threads constructed to alleviate the mechanical mismatch between hard rock and their soft invertebrate body, barnacles glue calcareous base plates to rocks and boat bottoms, and sandcastle worms live in tubes composed of sand, shell fragments, and blobs of underwater proteinaceous glue.

The objective of using underwater adhesives for wet applications, i.e. using Barnacle cements for dental cements, has been pursued since at least the late 1960s. During the last decade, new strategies for fabricating multi-functional underwater adhesives were developed by exploiting the adhesive characteristics of catechol functional groups.

There are two general approaches to the fabrication of catechol functionalized adhesives. In the first approach, adhesives are made by conjugating catechol functional groups to polymers such as disclosed in, at least, US Patent Publication No. 2003/0087338 entitled Adhesive DOPA-containing Polymers and Related Methods of Use, US Patent Publication No. 2005/0288398 entitled Polymeric Compositions and Related Methods of Use, U.S. Pat. No. 8,227,628 entitled Method of Synthesizing Acetonide-Protected Catechol-Containing Compounds and Intermediates Produced Therein and U.S. Pat. No. 7,943,703 entitled Modified Acrylic Block Copolymers for Hydrogels and Pressure Sensitive Wet Adhesives. Other references relating to this topic include U.S. Pat. No. 6,506,577 entitled Synthesis and Crosslinking of Catechol Containing Copolypeptides, U.S. Pat. No. 7,622,533 entitled Biomimetic Compounds and Synthetic Methods Therefor and US Patent Publication No. 2009/0036611 entitled Cross-Linkable Polymeric Compositions.

The second approach is a bottom-up process where adhesives are produced by the expression and purification of recombinant mussel adhesive proteins such as disclosed in U.S. Pat. No. 7,622,550 entitled Mussel Bioadhesive.

The applications of catechol functionalized adhesives can be divided into three categories. In the first category, the adhesives are used to replace commercial medical sealants such as disclosed in US Patent Publication No. 2008/0247984 entitled DOPA-Functionalized, Branched, Poly (Aklylene Oxide). Adhesives; US Patent Publication No. 2011/0027250 entitled Sealants for Fetal Membrane Repair, US Patent Publication No. 2010/0137902 entitled Bioadhesive Constructs; U.S. Pat. No. 5,665,477 entitled Hydrogel, Adhesive for Attaching Medical Device to Patient and U.S. Pat. No. 7,943,703. More specifically, US Patent Publication No. 2008/0247984 and US Patent Publication No. 2011/0027250 describe branched catechol terminated polymers for tissue repair, US Patent Publication 2010/0137902 describes a catechol functionalized wrap for applications such as bone repair, and U.S. Pat. No. 5,665,477 describes catechol functionalized hydrogel for attaching medical devices to wet tissues.

In the second category, the adhesives are used as anti-fouling, anti-bacterial, and anchoring surface coatings such as disclosed in US Patent Publication No. 2008/0171012 entitled Fouling Resistant Coatings and Methods of Making Same, U.S. Pat. No. 8,293,867 entitled Substrate-Independent Layer-by-Layer Assembly Using Catechol-Functionalized Polymers, US Patent Publication No. 2010/0028718 entitled Surface-Immobilized Antimicrobial Peptoids and US Patent Publication No. 2011-0052788 entitled Antifouling Hydrogels, Coatings, and Methods of Synthesis and Use thereof.

In the third category, the adhesives are used as underwater glues. Polystyrene, which is not ordinarily a component of adhesives, was used to mimic mussel adhesive proteins by incorporating catechol side chains, for which the polymer displayed enhanced adhesion upon cross-linking such as disclosed in US Patent Publication No. 2009/0036611 entitled Cross-Linkable Polymeric Compositions. In the same manner, the adhesive proteins of the sandcastle worm was also mimicked by synthesizing polyelectrolyte analogs with the same side chain chemistries and molar ratios of catechol, amine, and phosphate; forming a complex coacervate that qualitatively mimicked the entire range of natural glue behaviors including underwater delivery, interfacial adhesion, and triggered solidification such as disclosed in U.S. Pat. No. 8,283,384 entitled Adhesive Complex Coacervates and Methods of Making and Using Thereof and US Patent Publication No. 2009/0036611.

All of the prior solutions mentioned above require either complicated chemical modifications or synthesis of long-chain polymers with catechol functional groups or require the user making these adhesives to have a specific set of skills. The sophisticated fabrication process makes transferring of these solutions into practical applications and especially integration of them with existing systems difficult. For instance, adding adhesive properties to an existing drug delivery vehicle (hydrogel) by chemical modification is not really an option as the modification can result in a complete change in the vehicles' physical and chemical properties, rendering the previous understanding of the system obsolete. In terms of adhesion, the solutions mentioned above, although they have successfully mimicked certain aspects of natural underwater glue in terms of fluid properties, solidification, and adhesion, none of them have displayed any practical performance, i.e. achieving significant bond strength within a reasonable curing time (<2 hours). For example, although the synthetic polyelectrolyte glues of sandcastle worm have displayed a shear bond strength several times the estimated bond strength of the natural adhesive, the adhesive was applied on wet, smooth, and acid-treated aluminum substrates in air, and then submerged in water with a curing time of 24 hours.

Therefore, a need exists for new synthetic adhesive materials that overcome one or more of these current disadvantages.

SUMMARY OF THE DISCLOSURE

The present disclosure relates to the field of underwater or wet adhesives and their applications of adhesive, bonding, joining, repairing, patching and laminations in the different industries such as manufacture industries for marine, chemical, medical, biotechnology industries.

Through the study of amino acid composition of proteins, DOPA (3,4-dihydroxy-L-phenyalanine), an amino acid formed by posttranslational modification of tyrosine, has been identified as a recurrent constituent of the glues from organisms in nature. In particular, the catechol functionality of DOPA is mainly responsible for water-resistant adhesion and that the o-quinone functionality (oxidized catechol) is primarily responsible for cross-linking of the glues. Although the exact binding mechanism of catechol functionality to different materials is still not fully understood, it has been reported from a single-molecule study of DOPA by atomic force microscopy that the binding mechanism is not hydrogen bond formation and the oxidation of DOPA reduces the strength of interactions to metal oxide but results in high strength irreversible covalent bond formation to an organic surface. Evidence suggest that the interaction is co-ordination bonding with metal or metal oxide which involves the replacement of a surface hydroxyl group with deprotonated ligand and the interactions are covalent with organic surfaces via Michael, addition and Schiff base reactions.

In one aspect of the disclosure, there is provided a wet/underwater adhesive material comprising hydrophilic adhesive molecules.

In another aspect, there is provided a wet/underwater adhesive material comprising hydrophilic adhesive molecules and an oxidizing agent.

In another aspect, there is provided a wet/underwater adhesive material comprising hydrophilic adhesive molecules, a hydrophilic polymer and an oxidizing agent Further details of the invention will be described or will become apparent in the course of the following detailed description and drawings of specific embodiments of the invention, as examples.

BRIEF DESCRIPTION OF THE DRAWINGS

Embodiments of the invention will now be described, by way of example only, with reference to the attached drawings, in which.

DETAILED DESCRIPTION OF THE DISCLOSURE

Figure 1:
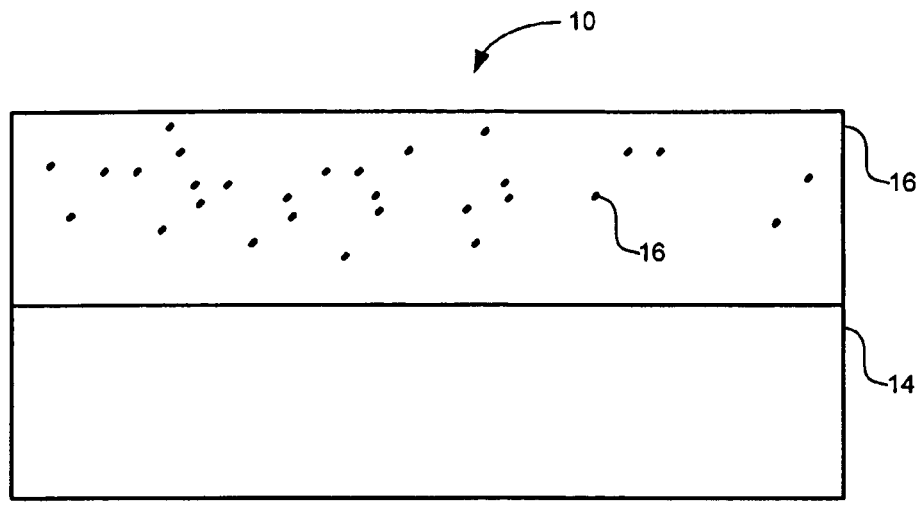
FIG. 1 is a schematic diagram of an embodiment of adhesive material for underwater or wet adhesion.

In the following description, various embodiments of the present disclosure will be described. For purposes of explanation, specific configurations and details are set forth in order to provide a thorough understanding of the embodiments. However, it will also be apparent to one skilled in the art that the present disclosure may be practiced without the specific details. Furthermore, well-known features may be omitted or simplified in order not to obscure the embodiment or embodiments being described.

The disclosure is directed at a novel wet/underwater adhesive material composition for joining and bonding applications in underwater settings. In other words, the adhesive material may be used underwater whereby application of the adhesive material to adhere surfaces located underwater may be performed on site. Therefore, the application of the adhesive material may take place underwater. In one embodiment, the adhesive material is prepared by combining an adhesive crosslinking agent or hydrophilic adhesive molecules, hydrophilic polymers, and an oxidizing agent. The adhesive crosslinking agents may comprise molecules with one or more catechol (dihydroxyphenyl) functional groups. The catechol functional groups of these molecules upon oxidation (either accelerated by the oxidizing agent or by the oxygen present in the aqueous medium) allow these molecules to self-polymerize and crosslink with hydrophilic polymers and surfaces in contact thereby building cohesive and adhesive strength of the adhesive material. Hydrophilic polymers may be used with the adhesive crosslinking agents or adhesive molecules to fine-tune the bulk rheological and mechanical properties of the adhesive material. Due to the reactive nature of catechol, the polymers may be any materials and suitable materials are discussed throughout the specification. Oxidants, or oxidizing agents may be incorporated into or integrated with the adhesive molecules or the hydrophilic polymers to promote the crosslinking of the catechol functional groups with each other and/or polymers and surfaces upon activation of the oxidizing agent. The components (such as the adhesive molecules, the hydrophilic polymers and the oxidizing agent) of the adhesive material might be mixed prior to use or delivered separately depending on the type of application required. By combining the adhesive crosslinking ability of the marine organisms with the accessibility of a wide range of hydrophilic polymers, a nearly limitless array of new compositions for tissue engineering platforms and medical and underwater adhesives may be developed. The compositions may have broad applications in diverse areas from industry to consumer products and beyond.

In one embodiment, the adhesive material may comprise hydrophilic adhesive molecules alone depending on the types of surfaces being connected and assuming that the adhesion is taking place underwater, or in an aqueous medium which includes oxygen. In another embodiment, the adhesive material may comprise a combination of hydrophilic adhesive molecules and hydrophilic polymers. Depending on the surfaces being connected and assuming that the adhesion is taking place underwater, or in an aqueous medium which includes oxygen, the adhesive material may not need to include an oxidizing agent. In yet another embodiment, the adhesive material may comprise hydrophilic adhesive molecules and an oxidizing agent. These may be separate components or may be combined to provide a complete adhesive material. The presence of the oxidizing agent allows for the curing of the adhesive molecules to be accelerated compared to the embodiment where the adhesive material only comprises the hydrophilic adhesive molecules. In this embodiment (combination of hydrophilic adhesive molecules and oxidizing agent), the adhesion may be completed in a more expedient manner than if there was no oxidizing agent. In yet a further embodiment, the adhesive material comprises hydrophilic adhesive molecules, hydrophilic polymer and an oxidizing agent. In practice, the hydrophilic adhesive molecules and the oxidizing agent or the hydrophilic polymer and the oxidizing agent may be combined to form one of the components of the wet/underwater adhesive material while the other part forms a second component. Alternatively, all three may form a single component or the finished product.

In manufacturing or producing the novel wet/underwater adhesive, each of the components is readily available as will be discussed below. Alternatively, the components may also be synthesized chemically through various methods. Also, due to the flexibility of the material compositions, the approach can be easily integrated with existing systems, in other words, the wet/underwater adhesive material may turn known hydrogels into an adhesive for use in on site underwater application. An advantage of the adhesive material of the disclosure is that it may lead to technologies that require lower capital investment and lower cost of production and deliver higher profitability since underwater fixes may be performed on site.

In the following description, as generally used herein "adhesive material" refers to a liquid composition comprising of adhesive crosslinking agents with or without hydrophilic polymers or oxidants/oxidizing agents. The term "catechol functional group" refers to an orthodihydroxyphenyl functional group. The term "reaction environment" is used herein to broadly refer to the variety of reagents and reactions conditions which may influence the reactivity of catechol. Such conditions include, but are not limited to, temperature, pH, oxidizing agents and the duration of exposure to the different variable within this environment. The term "crosslinking" or "curing" is used here to refer to the chemical conversion of catechol functional groups into o-quinone functional groups which then react/bond/bind with itself and other molecules. The term "hydrophilic" refers to soluble in aqueous medium.

Turning to FIG. 1, a schematic diagram of a first embodiment of a wet/underwater adhesive or adhesive material is shown. Unlike other known adhesive materials, the material disclosed in the current disclosure is capable of being used underwater allowing for individuals to fix items which are located at the bottom of an ocean floor. While the adhesive may be used in any circumstances that a known adhesive is used, the adhesive of the current disclosure may also be applied and used while the user is underwater which is novel over other known adhesives.

In one embodiment, as schematically shown in FIG. 1, the wet/underwater adhesive 10 or adhesive material includes hydrophilic adhesive molecules 12 in combination with hydrophilic polymers 14 along with an oxidizing agent 16. In the current embodiment, the hydrophilic adhesive molecules 12 provide the adhesive property to the adhesive material 10 while the polymer 14 provides further support and structure to improve the adhesive property of the adhesive while the oxidizing agent 16 provides a material which assists in accelerating the adhesive property of the hydrophilic adhesive molecules 12 and hydrophilic polymers 14. In other words, the oxidizing agent 16 assists in activating the adhesion properties of the hydrophilic adhesive molecules in a more expedient matter such that the adhesive material does not harden until the two surfaces are connected.

In another embodiment, as discussed above, the adhesive material 10 may be made entirely from hydrophilic adhesive molecules. One such example of hydrophilic adhesive molecules is dopamine hydrochloride. This material has typically been used as a coating material, however, the inventors have determined that the material, in specific applications or situations, may also be used as an adhesive in wet or underwater applications. In further embodiments, hydrophilic polymers or oxidizing agents or both may be added to the hydrophilic adhesive molecules to improve the adhesive properties of the adhesive.

In an alternative embodiment, the adhesive material comprises hydrophilic adhesive molecules 12 containing one or more catechol functional groups; hydrophilic polymers 14, and at least one oxidizing agent 16 and its applications for joining/bonding in aqueous medium.

In yet a further embodiment, the hydrophilic adhesive molecules containing one or more catechol functional groups may be responsible for the cohesive crosslinking and adhesive bonding of the adhesive material. The molecules may include readily available molecules such as, but not limited to, dopamine, 3,4-Dihydroxy-D-phenylalanine, 3,4-Dihydroxy-L-phenylalanine, norepinephrine, 3,4-Dihydroxyphenylacetic acid, 3,4-Dihydroxybenzylamine, and mixtures of these molecules thereof. In a related embodiment, the molecules may be synthesized by chemical coupling of the molecules mentioned above.

For example, a molecule with two catechol functional groups can be formed by conjugating the amine functional group of dopamine with the carboxylic functional group of 3,4-Dihydroxy-L-phenylalanine under mild acidic conditions. Catechol containing molecules may also be chemically synthesized from similar molecules through traditional means. It is preferred that these catechol containing molecules can form at least two chemical bonds with neighbor molecules during crosslinking.

In another embodiment, the adhesive material includes hydrophilic polymers to control the overall mechanical and rheological properties of the adhesive material. Examples of hydrophilic polymers may include, but are not limited to, natural and synthetic polymers such as alginate, chitosan and other polysaccharides, collagen, chemical derivatives thereof, albumin and other hydrophilic proteins, polyamides, polyesters, polyurethanes, copolymers and mixtures thereof. For establishing impermanent and biodegradable bonding of the adhesive material, biodegradable chemical linkages such as anhydride, ester, amide bonds and others may be included in the backbone of the polymers, resulting in a scission of the polymer by hydrolysis or enzymatic cleavage. A wide range of molecular weights are suitable for the hydrophilic polymers of the adhesive material with the molecular weight preferably between about 200 Da and about 2,000 kDa. In the preferred embodiment, the polymer has a molecular weight of at least 1,000 Da. It is preferred that the polymer contains accessible functional groups, such as amines and thiols, which easily react with catechol containing molecules. In case the preferred functions groups are not present, the polymer may react with other functional groups, such as amine, found in the catechol containing molecules through the polymer's functionalities such as aldehydes, ketones, carboxylic acid derivatives, cyclic anhydrides, alkyl halides, acyl azides, isocyanates, isothiocyanates, and scuccinimidyl esters. Reaction may also be established through the coordination chemistry of multivalent ions found in the aqueous medium which connects the catechol functional group with the polymer.

In another embodiment, the adhesive material may include oxidizing agents to initiate or accelerate the curing of the adhesive material. Examples of oxidants or oxidizing agents include, but are not limited to, enzyme like mushroom tryosinase, ammonium persulfate, $NaIO_4$, $H_2O_2$, and multivalent cations such as $Fe^{3+}$. In the absence of these oxidants, curing might be initiated by $O_2$ naturally dissolved in the aqueous medium. The curing process only occurs at certain ranges of pH and temperature depending on the oxidants present such that the adhesive material may be designed in a way that it cures under, physiological (pH 7.4 and 37° C.) and marine conditions (pH>8.2) but is stable under other conditions.

Figure 2:
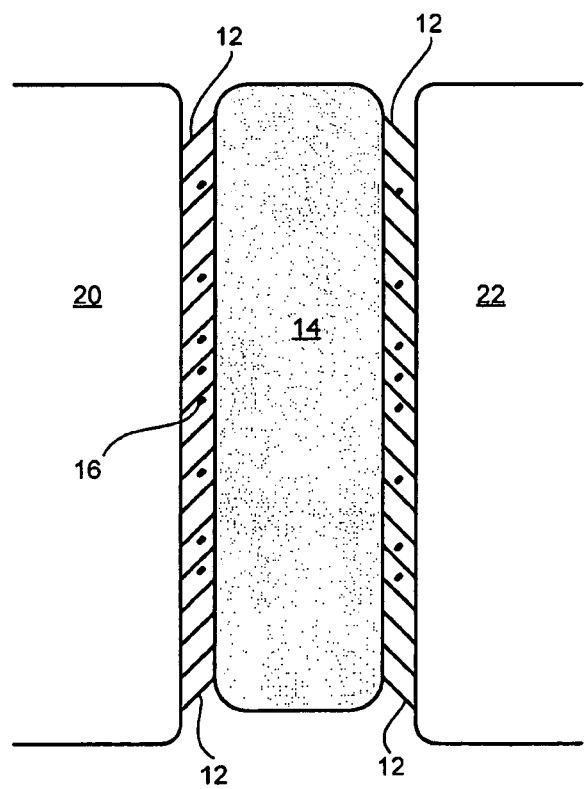
FIG. 2 is a schematic diagram of the adhesive material of FIG. 1 in use.

In another embodiment, the adhesion characteristics of the adhesive material such as its adhesive strength at different curing times may be improved or optimized by controlling its fluid properties, curing behaviors, and the method of delivery with respect to the reaction environment. The fluid properties such as viscosity may be manipulated by the concentration, length, and type of the hydrophilic polymers used. The curing behaviors such as curing rate and crosslinking density may be controlled by the quantity and chemical structure of the adhesive crosslinking agent (adhesive molecules) and by the concentration and type of and the time of exposure to oxidizing agent present in the reaction environment. The components of the adhesive materials might be mixed prior to application or delivered individually to manipulate the structure of the adhesive material and hence its adhesion characteristics. For instance, joining of two surfaces in water might be performed by first wetting the surfaces with the crosslinking agents (adhesive molecules) and then sandwiching a solution of hydrophilic polymers in between so that the adhesion is enforced at the interface while preserving the viscoelasticity of the adhesive material at the bulk, which makes the joint stronger and more resistant to cracking such as shown in FIG. 2. Strong oxidants might be added at later times to give enough time for the crosslinking agents and the polymers to flow at the gap and have better contacts with the surfaces.

Figure 9:
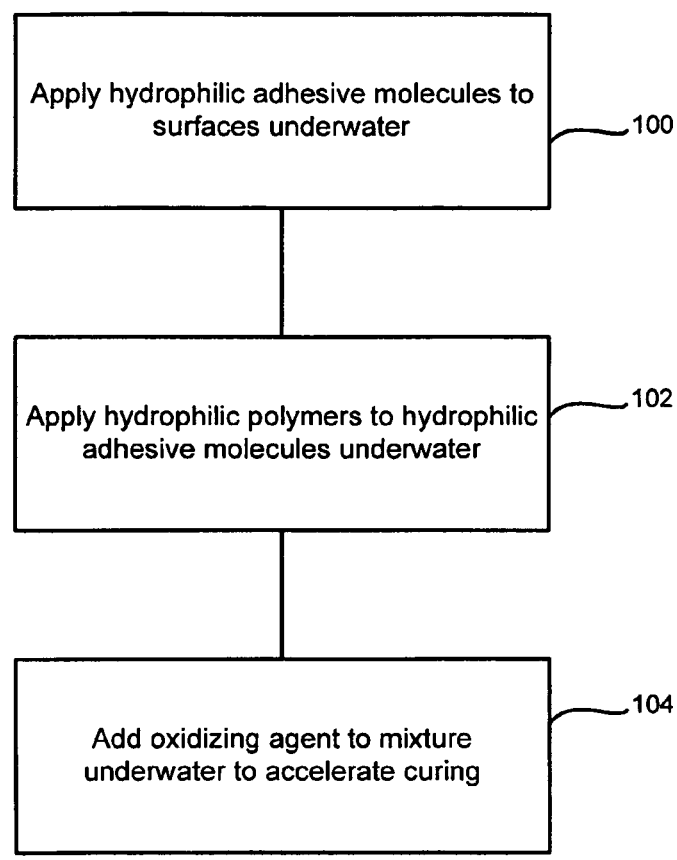
FIG. 9 is a flowchart outlining a method of underwater adhesion.

In FIG. 2, a pair of surfaces 20 and 22 are shown with a layer of hydrophilic adhesive molecules 12 applied to each layer 20 and 22. Sandwiched between the adhesive molecules 12 is a layer of hydrophilic polymers 14 which assist in filling any holes or pores within the layer of hydrophilic adhesive molecules 12 to strengthen the structure of the adhesive material and to improve the adhesion between the two surfaces. When performed underwater, the oxygen within the water may act as an oxidizing agent to initiate the curing process, however, it may be necessary, or preferred to include an oxidizing agent 16 within the adhesive material to accelerate the curing process. All of these steps being performed underwater, such as shown in the flowchart of FIG. 9.

In use, when underwater, the user first applies hydrophilic adhesive molecules to the surfaces being adhered 100. After applying the adhesive molecules, hydrophilic polymers may be applied to the hydrophilic adhesive molecules 102. Finally, if necessary, an oxidizing agent is added to the mixture to accelerate curing 104. As disclosed above, the method of underwater adhesion may include one or all of the disclosed steps, however, some of these steps may be performed in different order than shown.

In a further embodiment, the oxidizing agent may be combined with the hyrdrophilic adhesive molecules prior to its application onto the surface in that the combination may be developed as a single component of the adhesive material. In another embodiment, the oxidizing agent may be combined with the hydrophilic polymers prior to its application onto the adhesive molecules in that the combination may be developed as a single component of the adhesive material. In both cases, the combination may be performed at a factory and sold as a product or it may be provided to a user who can then prepare the combination immediately prior to using it underwater.

Other applications for the different embodiments of the wet/underwater adhesive include, but are not limited to, use as an additive to enhance adhesion between two surfaces with or without oxidizing agents, use as an additive to turn hydrogel materials into glues or use as underwater superglue to bond similar or distinct surfaces in water.

EXAMPLES

The following examples provide a detailed illustrative description of different embodiments of a wet/underwater adhesive material and methods of producing these adhesive materials. The examples merely illustrate how a wide array of adhesion characteristics, such as, but not limited to, the adhesive strength, may be achieved by varying particular elements of the system and the reduction to practice of these different non-restrictive embodiments.

Example 1

In a first experiment or manufacture, hydrophilic adhesive molecules, such as concentrated dopamine hydrochloride solution and a mixture of adhesive molecules such as dopamine hydrochloride with oxidizing agents comprising ferric nitrate, tris(hydroxymethyl)aminomethane (Tris), and water were injected at the interface between soft polydimethylsiloxane (soft as human tissue) acting as a first surface and hard glass substrates acting as a second surface underwater. Improvements on interfacial adhesion were observed despite the large mismatch in elasticity of the substrates. This kind of interfacial improvement may be beneficial to applications such as immobilizing implants in bodies.

Figures 4A, 4B:
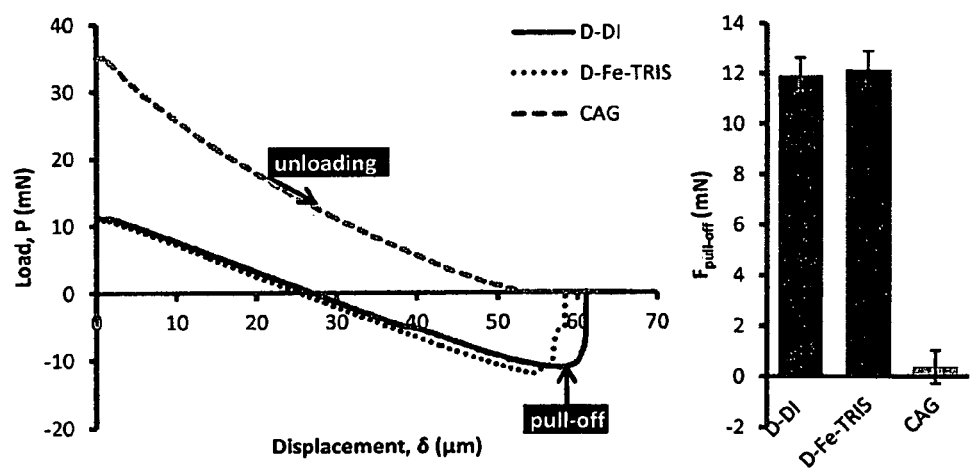
FIG. 4a is a chart outlining load and displacement curves for Example 1.
FIG. 4b is a chart outlining pull-off forces for one standard deviation for Example 1.

More specifically, the adhesive strength of polydopamine was studied by in-situ polymerization of dopamine between two surfaces underwater. 0.1 mL of concentrated dopamine solution at 1:8 dopamine to water mole ratio was injected and sandwiched between a hemispherical soft PDMS tip and a flat rigid microscope slide in 10 mM TRIS-HCl buffer at pH 8.5. The soft tip was indented 50 μm into the slide to ensure close contact between the two adherends while dopamine was being dissolved. The pull-off force was measured by unloading the tip from the slide at 0.1 μm/sec after 12 hours of curing time. Commercial aquarium superglue was used as a control. As instructed by its user guide, the superglue was applied in air on wetted tip before loading the tip into the substrate in the buffer. FIG. 4a shows the typical load-displacement curves and FIG. 4b shows the associated pull-off forces with one standard deviation for various mixtures where D-Di represents dopamine hydrochloride, D-FE-TRIS represents of dopamine hydrochloride, ferric nitrate, tris(hydroxymethyl)aminomethane (Tris) and CAG represents commercial superglue. The pull-off force of 12 mN for the concentrated dopamine solution was significantly higher than the one for the commercial superglue at 0.3 mN indicating bonding of polydopamine at the joint. The force translates to an adhesive strength of approximately 50 kPa accounting for the contact area, which was about 275 μm in radius.

In another embodiment, the adhesive material provides a method of bonding and joining two similar or dissimilar materials underwater.

Example 2

Figures 3A, 3B, 3C:
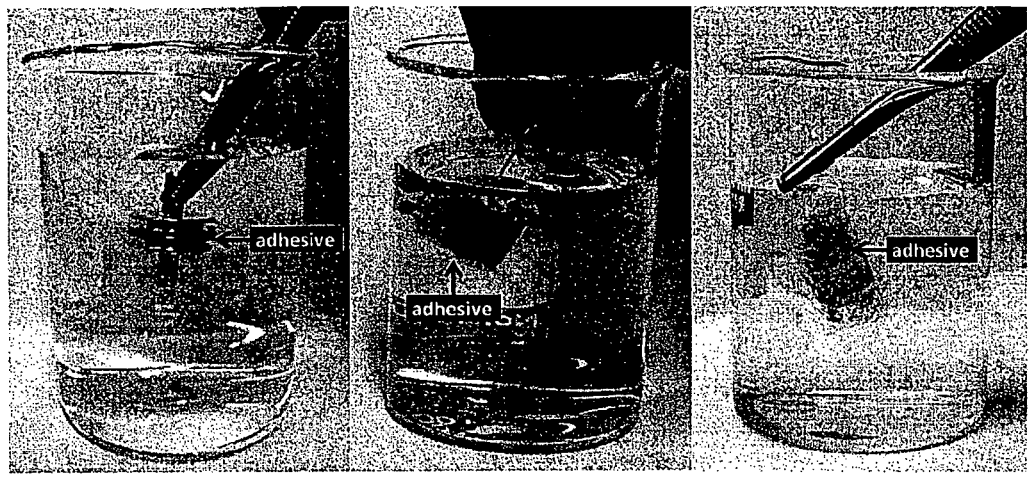
FIG. 3a is a photograph of the adhesive material in use joining a pair of rigid aluminum SEM stubs in a beaker of water.
FIG. 3b is a photograph of the adhesive material in use joining two pieces of soft PVA hydrogels.
FIG. 3c is a photograph of the adhesive material in use joining two pieces of flexible plastic.

In another experiment or manufacture, the adhesive material provides a method of bonding and joining two similar or dissimilar materials underwater. In this example, the adhesive material comprises two distinct components comprising adhesive molecules, hydrophilic polymers and at least one oxidizing agent. The first component being a mixture of four chemicals: dopamine hydrochloride (hydrophilic adhesive molecules), ferric nitrate (oxidizing agent), tris(hydroxymethyl)aminomethane (TRIS) (oxidizing agent), and water (oxidizing agent). The second component is a solution of sodium alginate (hydrophilic polymer) that forms a hydrogel network with the first component when mixed. During experimentation, the bonding or joining was performed by sequential injections of the first component and the second component at the joint (between two surfaces to be adhered) in water. The surfaces were lightly squeezed together after each injection to evenly distribute the adhesive material at and over the interface and were held together for the duration of curing of the adhesive material. The adhesive material has been shown to be able to bond rigid and soft substrates in water as shown in FIGS. 3a to 3c a photo of a pair of rigid aluminum SEM stubs adhered together underwater (FIG. 3a), two pieces of soft PVA hydrogels adhered together underwater (FIG. 3b) and two pieces of flexible plastic (polyethylene terephthalate, PET) films adhered together underwater (FIG. 3c) joined by the dopamine-alginate hybrid hydrogel adhesive in 10 mM TRIS-HCl buffer at pH 8.5 for 2 hours of curing time. In this case, the actual steps of adhering the two surfaces together were performed underwater which is one of the advantages of the current adhesive material. Adhesion applications for underwater problems or materials may be performed on site and do not have to be done outside of the water and then transported to the location of the problem.

Results by tensile tests indicated that the joint at a curing time of 2 hours and with a contact area of 100 mm$^2$ is permanent and can hold at least 1 kg of weight, giving a minimal bonding strength of 100 kPa, which is comparable to marine mussel's adhesion on glass, 171 kPa. Therefore, as shown, the adhesive material may function as underwater "superglue" and in another aspect, the adhesive material may turn into a hydrogel material, alginate, with little to no adhesion into superglue.

In the experiment, the first component was created from a mixture of dopamine hydrochloride, TRIS, and ferric nitrate in deionized water at a mole ratio of 12:96:1 for dopamine, water, and iron and a mass ratio of 2:1 for dopamine and TRIS. The mixture displayed an intense dark red color indicating strong charge transfer from the non-bonding u orbitals of catechol oxygen to empty d orbitals of iron. 5 wt. % alginate solution (from brown algae; medium viscosity) was used in conjunction with the dopamine-iron complex mixture to provide structural and rheological support. It is expected to deliver temporary adhesion and cohesion at the joint because of the high viscosity caused by hydrogen bonding among the carboxylic and hydroxyl functional groups of alginate. Alginate is known to gel in the presence of multivalent ions.

Figure 5:
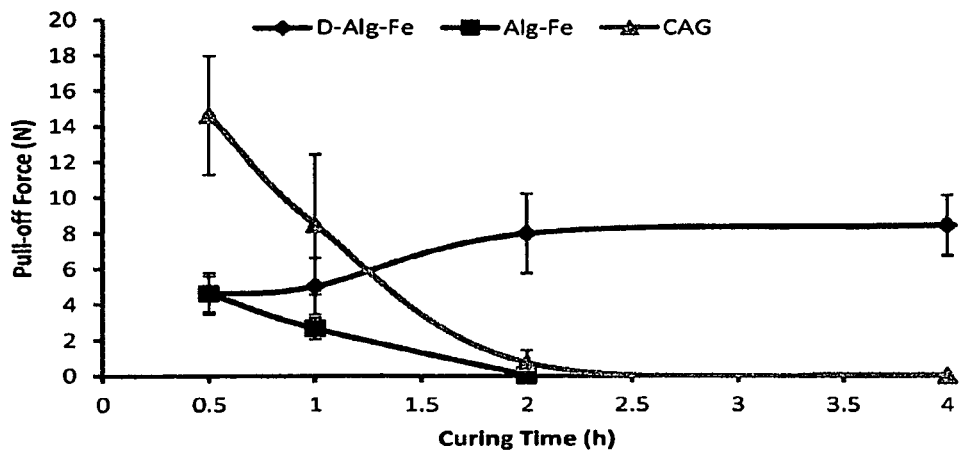
FIG. 5 is a chart displaying a comparison of pull-off forces for Example 2.

Standard aluminum SEM stubs were joined to microscope slides by sequent injections of the first component and the alginate solution (second component) at the joint in the buffer solution at pH 8.5, such that the mixture sandwiches the solution at the interface. The chart of FIG. 5 compares the pull-off forces of the joints at different curing times at a speed of 1 cm/min for the adhesive material (D-Alg-Fe). The pure iron solution in combination with alginate (Alg-Fe) and the commercial superglue (CAG) were used as controls. Again, the commercial superglue was applied to wet SEM stub surface in air while both the bioadhesive and the pure iron control were applied directly underwater.

The results showed that although the adhesive and its pure iron control both have the same initial pull-off force of 5 N at 30 min curing time, the force for the hybrid adhesive increased over time and plateaued at 10 N for 2 hours of curing time while the force for the control diminished to zero within 2 hours. Accounting for the contact area of the SEM stub of 100 mm$^2$, 10 N translates to 100 kPa, which is about half of natural mussel adhesion to glass at 171 kPa. It should be noted that the actual strength of the adhesive is likely higher as the surface of the SEM stubs displayed a macroscopic roughness that was visible to the naked eye. The joint of hybrid adhesive appeared to be permanent as it remained intact in fresh deionized water within the observation period of 3 months. The failure of the joint was cohesive under the examination of microscope indicating bonding at both surfaces. In comparison, the commercial superglue cured and hardened faster (in 5 min) in the buffer and displayed a much stronger initial adhesion of 15 N than our adhesive, but it quickly lost its strength and the pull-off force was only around 1 N at 2 hours of curing time. The failure of the joint for CAG was adhesive at the glue-glass interface and was likely a result of crazing of water at the interface as reported by others. Tests were repeated for the case of pure dopamine and pure dopamine-iron complex and no pull-off forces were detected for those. It was determined that the improved performance of the hybrid adhesive was due to the combination of the immediate cohesion of alginate and the gradual adhesion of dopamine.

Example 3

In another experiment or manufacture, it was shown that the adhesive material may maintain improved performance and decent adaptabilities to meeting requirements of various applications. In this experiment, the adhesive material was able to perform at different pH and temperature, ranging from 4 to 10 and 20 to 40° C., respectively and on different substrates, such as polyethylene terephthalate. The formulation of the adhesive material, in this embodiment, is seen as flexible such that its adhesive components (the hydrophilic adhesive molecules, the hydrophilic polymers and the oxidizing agents) may be substituted with different hydrophilic polymers such as poly(sodium 4-styrenesulfonate) and different oxidizing agents such as ammonium persulfate and calcium ions. Results from by tensile tests indicated that the bond strength at a curing time of 2 hours and with a contact area of 100 mm$^2$ is in general over 0.5 kg or 50 kPa for these diverse application circumstances.

In this experiment, the adaptability of the adhesive material for different application circumstances was tested by varying different experimental parameters from a standard scenario. All experimental parameters remain the same as the standard unless stated otherwise. In the standard scenario (Std), the same procedures of Example 2 were carried out, where the complex mixture of dopamine hydrochloride, TRIS, and ferric nitrate in deionized water at a mole ratio of 12:96:1 for dopamine, water, and iron and a mess ratio of 2:1 for dopamine and TRIS and the hydrophilic polymer solution of 5% wt. alginate were used to join standard aluminum SEM stubs to microscope slides by sequent injections of the complex mixture and the alginate solution in 10 mM TRIS solution buffered at pH 8.5. The joints were tested after 2 hours of curing.

Figure 6:
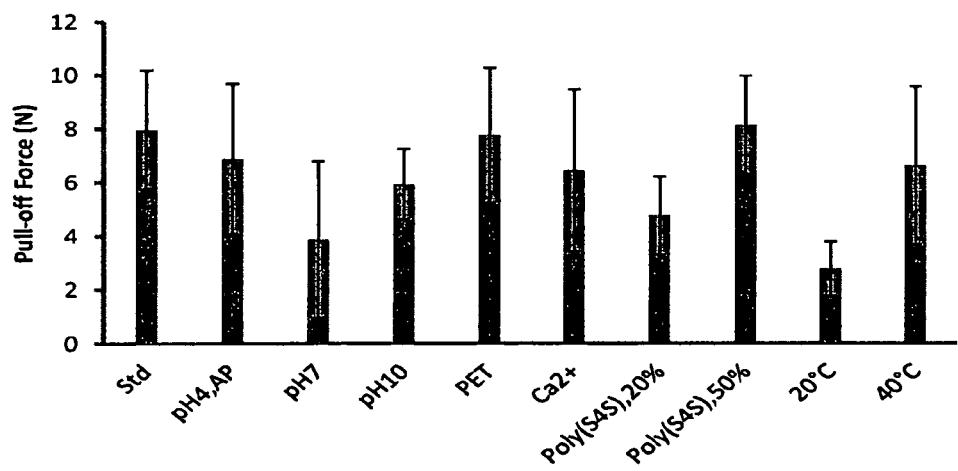
FIG. 6 is a chart displaying pull-off forces of an adhesive material under different reaction conditions for Example 3.

The chart in FIG. 6 compares the pull-off forces of the joints at a speed of 1 cm/min under different application circumstances including joining at pH 4, pH 7, pH 10, 20° C., and 40° C., joining on plastic film made of polyethylene terephthalate (PET) instead of glass, and joining with different adhesive components such as $Ca^{2+}$ instead of $Fe^{3+}$, ammonium persulfate (AP) instead of TRIS, and poly(sodium 4-styrenesulfonate) (poly(S4S)) instead of alginate. 0.1 M acetic acid, phosphate buffer, and 10 mM TRIS were used to maintain pH at 4, 7, and 10, respectively. AP was used at a mass ratio of 1:2 to dopamine to promote the polymerization of dopamine under acidic condition. Poly (S4S) ($M_w$~1,000,000) solution at 20% wt. and 50% wt. were tested as an alternative hydrophilic polymer to alginate solution. Calcium chloride was used at a mole ratio of 1:5 to dopamine for the $Ca^{2+}$ experiment.

Results from tensile tests indicated that the bond strength with a contact area of 100 mm$^2$ is in general over 0.5 kg or 50 kPa under these diverse application circumstances. The increase in strength from low temperature 20° C. to high temperature 40° C., and low polymer concentration 20% wt. to high polymer concentration 40% wt. indicated the rate of polymerization of dopamine and the viscosity of the polymer solution can be used as parameters to control the adhesive behavior.

Examples 4 and 5

In two other experiments or examples of manufacture, two specific underwater applications of the adhesive material were demonstrated. In one experiment (Example 4), the adhesive material was shown to be able to be used to patch underwater oil leakage by taping a plastic film with the adhesive at the point of spill. In another experiment (Example 5), the adhesive material was shown to be able to be used for underwater construction; for instance, an aluminum stub was joined to a rock in water without pretreatment of the rock surface.

Figures 7A, 7B:
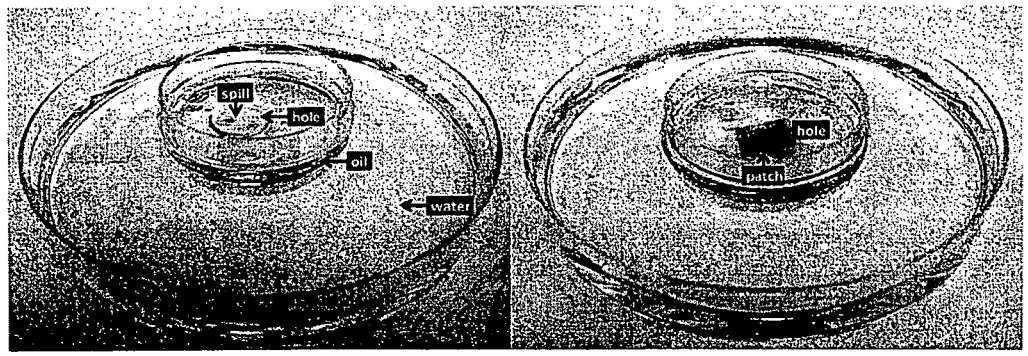
FIGS. 7a and 7b are photographs of two compartment oil-water models for Example 4.

In the Example 4 experiment, the adhesive material was used to repair underwater oil leakage. This was demonstrated by a two compartment oil-water model where the oil can was set to leak oil into water through, a small opening as shown in FIGS. 7a and 7b. In the model, a small Petri dish with a small hole of 1 mm in diameter was placed in a larger Petri dish at a leveled height of 0.5 cm. The large Petri was filled with water such that the water level is enough to immerse the bottom of the small. Petri dish. The small Petri dish was filled with vegetable corn oil such that the oil level is well above the water level. In the case where the small hole of the small Petri dish was not patched, the oil was leaked into the surrounding water immediately (FIG. 7a). In the case where the hole was patched by a piece of polyethylene terephthalate film, no leakage was observed within a week of the observation period (FIG. 7b). The patching of the hole was performed by gluing the film to the bottom of the small Petri dish by the underwater wet adhesive, which in one embodiment is dopamine-alginate hybrid hydrogel adhesive, in water with no curing time and oil was added to the small Petri dish immediately after patching.

Figures 8A, 8B:
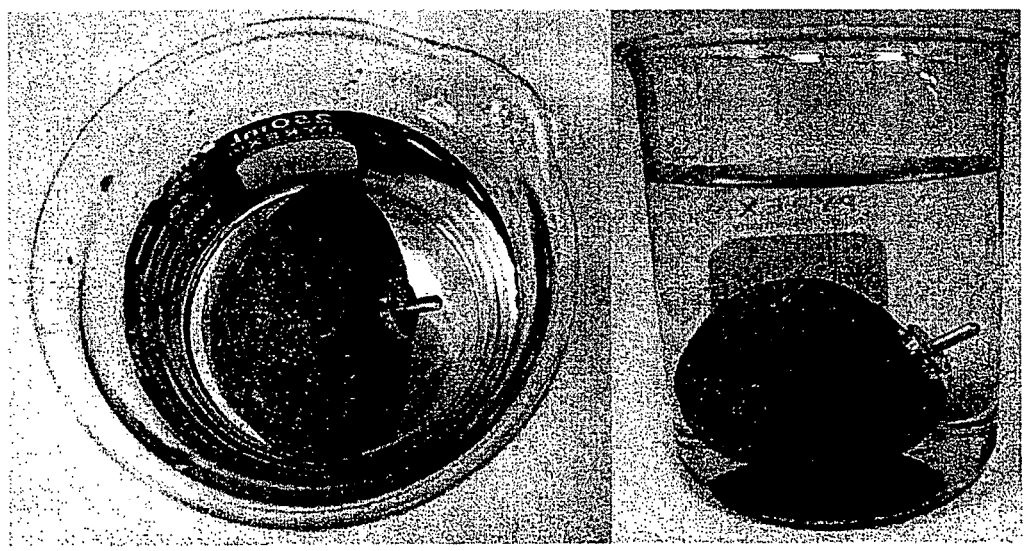
FIGS. 8a and 8b are photographs of a rigid aluminium SEM stubs bonded by a wet/underwater adhesive to a rock for Example 5.

In the Example 5 experiment, the adhesive material can also be used for underwater construction. As illustrated in FIGS. 8a and 8b, a rigid aluminum SEM stubs was bonded to a rock in water by the dopamine-alginate hybrid hydrogel adhesive with no special pre-treatments of the rock surface.

Preferred and exemplary embodiments of this invention are described herein. Variations of those embodiments may become apparent to those of ordinary skill in the art upon reading the foregoing description. It is expected that skilled persons will employ such variations as appropriate, and it is expected that the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Further variations may be apparent or become apparent to those knowledgeable in the field of the invention, and are within the scope of the invention as defined by the claims which follow.

What is claimed is:

1. A wet/underwater adhesive material comprising: hydrophilic adhesive molecules including self-polymerizing catechol molecules that generate an adhesive surface independent of a hydrophilic polymer.

2. The wet/underwater adhesive material of claim 1 further comprising at least one hydrophilic polymer.

3. The wet/underwater adhesive material of claim 1 further comprising an oxidizing agent.

4. The wet/underwater adhesive material of claim 3 wherein the hydrophilic adhesive molecules and the oxidizing agent are combined to form one component of the wet/underwater adhesive material.

5. The wet/underwater adhesive material of claim 1 wherein the hydrophilic adhesive molecules including self-polymerizing catechol molecules are synthesized from simpler molecules containing catechol functional groups.

6. The wet/underwater adhesive material of claim 1 wherein the hydrophilic adhesive molecules are a mixture of different molecules containing catechol functional groups.

7. The wet/underwater adhesive material of claim 1 wherein the hydrophilic adhesive molecules are at least one of dopamine, 3,4-Dihydroxy-D-phenylalanine, 3,4-Dihydroxy-L-phenylalanine, norepinephrine, 3,4-Dihydroxyphenylacetic acid, and 3,4-Dihydroxybenzylamine.

8. The wet/underwater adhesive material of claim 2, wherein the hydrophilic polymers have a molecular weight between about 200 Da to about 2,000 kDa.

9. The wet/underwater adhesive material of claim 2 wherein at least one of the hydrophilic polymers is an anionic polymer.

10. The wet/underwater adhesive material of claim 3 wherein the oxidizing agent is mushroom tryosinase, ammonium persulfate, $NaIO_4$, $H_2O_2$, $O_2$, or multivalent cations.

11. The wet/underwater adhesive material of claim 10 wherein the oxidizing agent is $Fe^{3+}$.

12. A method for forming adhering two surfaces underwater comprising:
in an underwater setting, applying hydrophilic adhesive molecules including self-polymerizing catechol molecules generating an adhesive surface independent of a hydrophilic polymer, to at least one of the two surfaces.

13. The method of claim 12 further comprising:
in an underwater setting, applying hydrophilic polymers to the hydrophilic adhesive molecules.

14. The method of claim 12 comprising:
in an underwater setting, applying an oxidizing agent to the hydrophilic adhesive molecules.

15. The method of claim 14 wherein the hydrophilic adhesive molecules and the oxidizing agent are one component.

16. The method of claim 13 further comprising:
in an underwater setting, applying an oxidizing agent to the hydrophilic adhesive molecules or the hydrophilic polymers.

17. The method of claim 16 wherein the hydrophilic adhesive molecules, the hydrophilic polymers and the oxidizing agent are mixed prior to application.

18. The method of claim 16 wherein the hydrophilic adhesive molecules and oxidizing agent wets the joint for bonding and the hydrophilic polymers is added to the joint.

19. The wet/adhesive material of claim 2 wherein the hydrophilic adhesive molecules are at least 5% of monomers in a backbone of the hydrophilic polymers.

20. The wet/underwater adhesive material of claim 9 wherein the anionic polymer is alginate.

* * * * *